United States Patent
Reutski et al.

(10) Patent No.: US 12,026,891 B2
(45) Date of Patent: Jul. 2, 2024

(54) METHODS AND SYSTEMS FOR FILTERING PORTIONS OF AN IMAGE

(71) Applicant: Aptiv Technologies AG, Schaffhausen (CH)

(72) Inventors: Pavel Reutski, Cracow (PL); Pawel Kowalczyk, Chabówka (PL)

(73) Assignee: Aptiv Technologies AG, Schaffhausen (CH)

( * ) Notice: Subject to any disclaimer, the term of this patent is extended or adjusted under 35 U.S.C. 154(b) by 381 days.

(21) Appl. No.: 17/479,316

(22) Filed: Sep. 20, 2021

(65) Prior Publication Data
US 2022/0108456 A1 Apr. 7, 2022

(30) Foreign Application Priority Data
Oct. 2, 2020 (EP) ..................................... 20199813

(51) Int. Cl.
| | |
|---|---|
| *G06T 7/194* | (2017.01) |
| *G06F 18/23* | (2023.01) |
| *G06F 18/2411* | (2023.01) |
| *G06T 7/11* | (2017.01) |

(52) U.S. Cl.
CPC .............. *G06T 7/194* (2017.01); *G06F 18/23* (2023.01); *G06F 18/2411* (2023.01); *G06T 7/11* (2017.01); *G06T 2207/30248* (2013.01)

(58) Field of Classification Search
CPC ........ G06F 18/23; G06F 18/2411; G06T 7/11; G06T 7/194; G06T 2207/30248; G06V 10/763; G06V 20/56
See application file for complete search history.

(56) References Cited

U.S. PATENT DOCUMENTS

| | | | | |
|---|---|---|---|---|
| 6,333,993 B1 * | 12/2001 | Sakamoto | ................. | G06T 7/11 |
| | | | | 358/464 |
| 8,249,333 B2 * | 8/2012 | Agarwal | ................... | G06T 7/11 |
| | | | | 382/173 |
| 2010/0158373 A1 | 6/2010 | Li et al. | | |

(Continued)

OTHER PUBLICATIONS

Avgerinakis et al. "Real time illumination invariant motion change detection." Proceedings of the first ACM international workshop on Analysis and retrieval of tracked events and motion in imagery streams. 2010. (Year: 2010).*

(Continued)

*Primary Examiner* — Katrina R Fujita
(74) *Attorney, Agent, or Firm* — Harness, Dickey & Pierce, P.L.C.

(57) ABSTRACT

A computer implemented method for filtering portions of an image comprises the following steps carried out by computer hardware components: dividing the image into a plurality of segments, each segments comprising a plurality of pixels; for each of the segments, determining at least one of an expected value, a standard deviation, and a kurtosis of the plurality of pixels of the respective segment; clustering the plurality of segments into a plurality of clusters based on the at least one of the expected value, the standard deviation, and the kurtosis of the plurality of pixels of the respective segment; for each of the clusters, determining the respective cluster as belonging to a background based on a size of the respective cluster; and determining a filtered image based on the background.

16 Claims, 3 Drawing Sheets

(56) References Cited

U.S. PATENT DOCUMENTS

| | | | |
|---|---|---|---|
| 2016/0125245 A1* | 5/2016 | Saitwal | G06T 7/136 |
| | | | 382/173 |
| 2016/0345819 A1 | 12/2016 | Jayasundera | |
| 2018/0046877 A1* | 2/2018 | Chen | G06V 20/40 |
| 2018/0189577 A1* | 7/2018 | Yoo | G06T 7/593 |

OTHER PUBLICATIONS

Briassouli et al. "Robust temporal activity templates using higher order statistics." IEEE Transactions on Image Processing 18.12 (2009): 2756-2768. (Year: 2009).*

Han et al. "State-aware anti-drift object tracking." IEEE Transactions on Image Processing 28.8 (Aug. 2019): 4075-4086. (Year: 2019).*

Kim et al. "Robust silhouette extraction technique using background subtraction." 10th Meeting on Image Recognition and Understand (MIRU). 2007. (Year: 2007).*

"Extended European Search Report", European Application No. 20199813.5, Feb. 26, 2021, 8 pages.

* cited by examiner

METHODS AND SYSTEMS FOR FILTERING PORTIONS OF AN IMAGE

CROSS-REFERENCE TO RELATED APPLICATION

This application claims priority to European Patent Application Number 20199813.5, filed Oct. 2, 2020, the disclosure of which is hereby incorporated by reference in its entirety herein.

BACKGROUND

The present disclosure relates to methods and systems for filtering portions of an image.

Digital imaging processing, for example in automotive applications, may be a computationally expensive task.

Accordingly, there is a need to increase efficiency of digital image processing.

SUMMARY

The present disclosure provides a computer implemented method, a computer system, a vehicle, and a non-transitory computer readable medium according for filtering portions of an image.

In one aspect, the present disclosure is directed at a computer implemented method for filtering portions of an image, the method comprising the following steps performed (in other words: carried out) by computer hardware components: dividing the image into a plurality of segments, each segments comprising a plurality of pixels; for each of the segments, determining at least one of an expected value, a standard deviation, and a kurtosis of the plurality of pixels of the respective segment; clustering the plurality of segments into a plurality of clusters based on the at least one of the expected value, the standard deviation, and the kurtosis of the plurality of pixels of the respective segment; for each of the clusters, determining the respective cluster as belonging to a background based on a size of the respective cluster; and determining a filtered image based on the background.

The filtered image may include only portions of the image not belonging to the background.

The segments may be rectangular portions of the image. The segments may be non-overlapping (in other words: each pixel may belong to exactly one segment). The plurality of segments, taken all together, may cover the entire image (in other words: each pixel may belong to at least one segment).

According to another aspect, the at least one of an expected value, a standard deviation, and a kurtosis are determined based on gray values of the respective pixels. For example, for a color image, the image may be converted into a gray scale image before dividing it into the plurality of segments.

According to another aspect, the computer implemented method further comprises the following step carried out by the computer hardware components: recovering segments from clusters belonging to the background as not belonging to the background. Recovering may be understood as determining, for a cluster belonging to the background, a segment of the cluster as not belonging to the background.

According to another aspect, segments from clusters belonging to the background are recovered based on a kurtosis of an expected value for each segment of the respective cluster. In other words, for each segment of the respective cluster, an expected value may be determined, and a kurtosis of these expected values may be determined and used for the recovering.

According to another aspect, segments from clusters belonging to the background are recovered based on a comparison of the kurtosis of the expected value for each segment of cluster with a kurtosis of the respective segment individually.

According to another aspect, the computer implemented method further comprises the following step carried out by the computer hardware components: providing an output comprising an indication for each pixel whether the pixel belongs to the background. A pixel may belong to the background if the segment to which the pixel belongs to the background.

According to another aspect, the computer implemented method further comprises the following step carried out by the computer hardware components: providing an output comprising an indication for each segment whether the segment belongs to the background.

According to another aspect, the computer implemented method further comprises the following step carried out by the computer hardware components: further processing the image. The further processing of the image may disregard (or not take into account or not process) portions (for example pixels or segments or clusters) of the image belonging to the background.

According to another aspect, the further processing comprises at least one of object detection or object classification.

According to another aspect, pixels belonging to the background and/or segments belonging to the background are excluded from the further processing. This may reduce processing cost, while at the same time, by the determination of the background with the method according to various aspects, the important details of the image may be preserved and thus may be processed.

In another aspect, the present disclosure is directed at a computer system, said computer system comprising a plurality of computer hardware components configured to carry out several or all steps of the computer implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

According to another aspect, the computer system further comprises a camera configured to acquire the image.

In another aspect, the present disclosure is directed at a vehicle comprising the computer system as described herein.

According to another aspect, the vehicle further comprises a camera configured to acquire the image.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein. These and other computer methods, computer systems, computer-readable storage mediums, and computer programs are described with respect to the following Specification and the accompanying Drawings, a brief description of which is presented below.

BRIEF DESCRIPTION OF THE DRAWINGS

Exemplary embodiments and functions of the present disclosure for filtering portions of an image are described herein in conjunction with the following drawings, showing.

DETAILED DESCRIPTION

Figure 1:
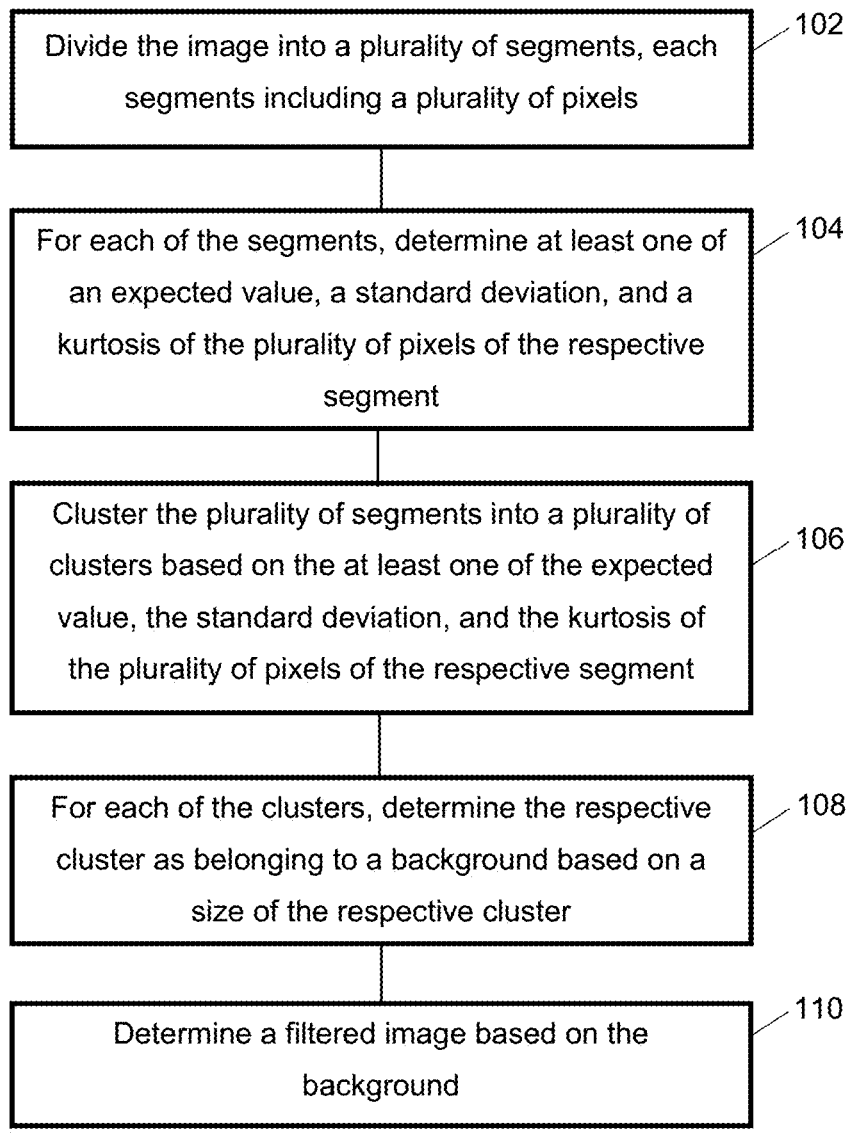
FIG. 1 a flow diagram illustrating a method for filtering portions of an image according to various embodiments.

Digital imaging processing, for example in automotive applications, may be a computationally expensive task. The computational effort of image processing may depend on the number of pixels in the image to be processed.

For example, an image may be scaled to a smaller size, so that the computational effort may be reduced. However, important details in the image may be lost.

Furthermore, it has been found that often a large portion of the pixels of an image does not include details of interest.

According to various embodiments, a method for filtering portions of an image (in other words: a method for filtering an image) may be provided. For example, the image may be filtered so that the details of interest are preserved, but unnecessary information is removed from consideration.

The methods according to various embodiments may provide statistical visual background filtering.

The method may filter unnecessary information from an image (or from a plurality of images, for example from images of a video), for example taken by a camera mounted on a vehicle, by dividing the images into a fixed number of segments for separate processing to allow focusing of later processing, for example classification processing, on crucial parts of the images.

In order to filter unnecessary information from an image (which may also be referred to as a picture), the image may be divided it into a fixed number of segments.

For each segment, the mathematical expectation (M, which may also be referred to as expected value, mean, average, or first moment), the standard deviation (Sigma) and the kurtosis (K) may be calculated based on a grey (resolution) level of pixels.

Defining segment similarity, segments may be clustered using dynamically redefined keys for each cluster and a chosen level of tolerance for incoming segment. For example, a best possible cluster in terms of mathematical expectation may be chosen.

Based on number of created groups (in other words: clusters), a minimal size of a cluster (for example size in terms of segments or in terms of pixels) may be defined for which the cluster may be classified as "background" (in other words: belonging to background; in other words: including unnecessary information).

Each cluster (in other words: group) may have segments and there may be several clusters (groups). A background cluster (in other words: background group) may be one that contains segments, with a segment count exceeding a threshold value. An Initial threshold value may be chosen as N/2, where N may be a maximum segments count across all similarity clusters (groups). So, the cluster size (in other words: group size; in other words: segments count) may provide its □identity" or a candidate being filtered out.

For each cluster classified as (belonging to the) background, a statistic called Kurtosis may be calculated again, but this time on the basis of a mathematical expectation for each segment in a given cluster.

Comparing the individual kurtosis of each segment and the cluster kurtosis, a second phase of filtering may be performed according to various embodiments, but this time it may be decided which segments should be recovered from "background" type of cluster (in other words: which segments which are included in a "background" cluster do not actually belong to the background; in other words: which segments should be moved from "background" to "non-background" or "foreground").

For example, the non-background segments may be desired to include objects like traffic signs and lights.

Filtering unnecessary information from images or a video may allow for classification methods, for example in cars, to focus on the most crucial parts of the image and may provide savings in data storage during software development.

FIG. 1 shows a flow diagram 100 illustrating a method for filtering portions of an image according to various embodiments. At 102, the image may be divided into a plurality of segments, each segments including a plurality of pixels. At 104, for each of the segments, at least one of an expected value, a standard deviation, and a kurtosis of the plurality of pixels of the respective segment may be determined. At 106, the plurality of segments may be clustered into a plurality of clusters based on the at least one of the expected value, the standard deviation, and the kurtosis of the plurality of pixels of the respective segment. At 108, for each of the clusters, the respective cluster may be determined as belonging to a background based on a size of the respective cluster. At 110, a filtered image may be determined based on the background.

The method may provide (or forward) an image (which may be a pixels set) with the original dimension, wherein clusters (in other words: groups) determined as backgrounds are filled with zero volume pixel items. For example, when RGB (red green blue) background clusters (in other words: groups; in other words: segments sets) may be combined from all clusters/groups not depending on their location on an image having pixels with a (0, 0, 0) three tuple. In other words, in the filtered image, pixels belonging to the background may be set to a value of 0.

For further processing (for example when applying a vision method) to the filtered image, pixel items with zero volume (in other words: zero value) may be ignored.

According to various embodiments, the at least one of an expected value, a standard deviation, and a kurtosis may be determined based on gray values of the respective pixels.

According to various embodiments, the computer implemented method may further include the following step carried out by the computer hardware components: recovering segments from clusters belonging to the background as not belonging to the background.

According to various embodiments, segments from clusters belonging to the background may be recovered based on a kurtosis of an expected value for each segment of the respective cluster.

According to various embodiments, segments from clusters belonging to the background may be recovered based on a comparison of the kurtosis of the expected value for each segment of cluster with a kurtosis of the respective segment individually.

According to various embodiments, the computer implemented method may further include the following step carried out by the computer hardware components: providing an output including an indication for each pixel whether the pixel belongs to the background.

According to various embodiments, the computer implemented method may further include the following step carried out by the computer hardware components: providing an output including an indication for each segment whether the segment belongs to the background.

According to various embodiments, the computer implemented method may further include the following step carried out by the computer hardware components: further processing the image.

According to various embodiments, the further processing may include or may be at least one of object detection or object classification.

According to various embodiments, pixels and/or segments belonging to the background may be excluded from the further processing.

Each of the steps 102, 104, 106, 108, 110 and the further steps described above may be performed by computer hardware components.

Figure 2:
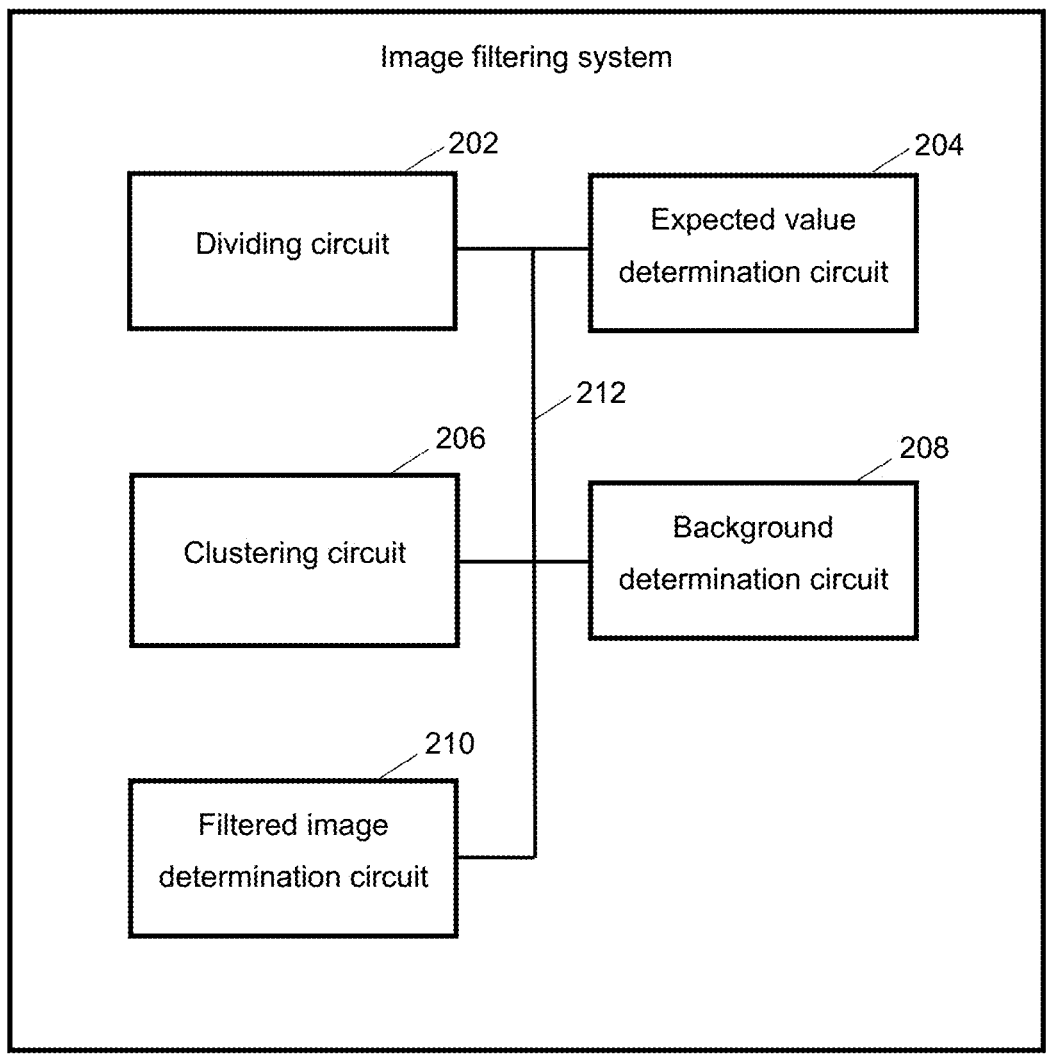
FIG. 2 an image filtering system according to various embodiments.

FIG. 2 shows an image filtering system 200 according to various embodiments, for filtering portions of an image. The image filtering system 200 may include a dividing circuit 202, an expected value determination circuit 204, a clustering circuit 206, a background determination circuit 208, and a filtered image determination circuit 210

The dividing circuit 202 may be configured to divide the image into a plurality of segments, each segments comprising a plurality of pixels.

The expected value determination circuit 204 may be configured to, for each of the segments, determine at least one of an expected value, a standard deviation, and a kurtosis of the plurality of pixels of the respective segment.

The clustering circuit 206 may be configured to cluster the plurality of segments into a plurality of clusters based on the at least one of the expected value, the standard deviation, and the kurtosis of the plurality of pixels of the respective segment.

The background determination circuit 208 may be configured to for each of the clusters, determine the respective cluster as belonging to a background based on a size of the respective cluster.

The filtered image determination circuit 210 may be configured to determine a filtered image based on the background The dividing circuit 202, the expected value determination circuit 204, the clustering circuit 206, the background determination circuit 208, and the filtered image determination circuit 210 may be coupled with each other, e.g. via an electrical connection 212, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 3:
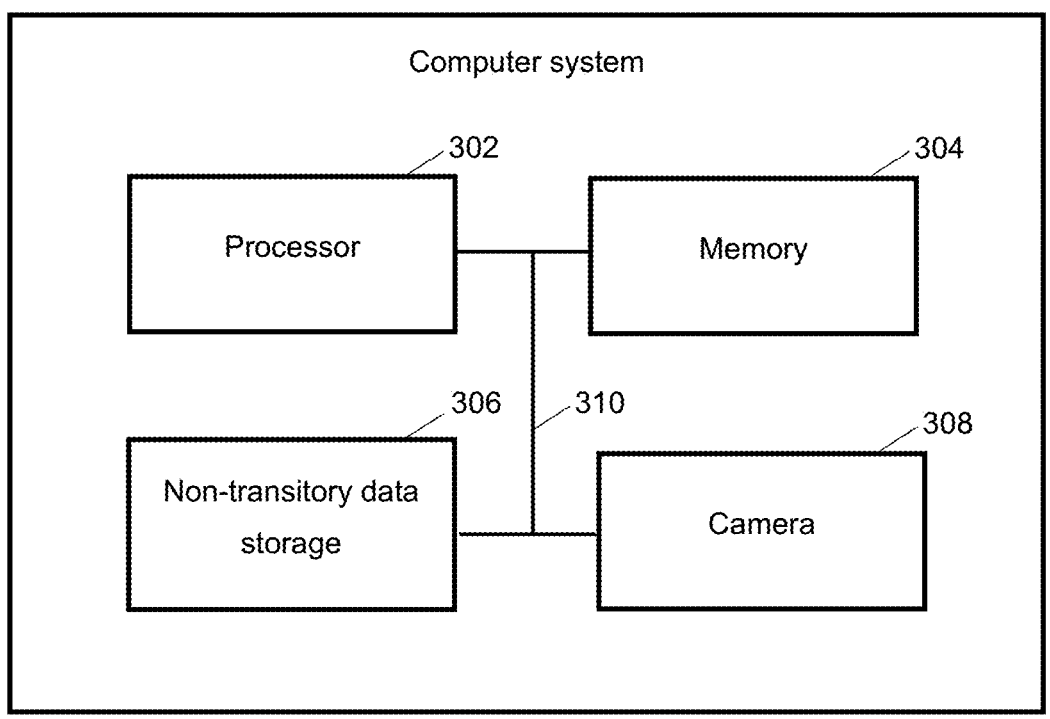
FIG. 3 a computer system with a plurality of computer hardware components configured to carry out steps of a computer implemented method for filtering portions of an image according to various embodiments.

FIG. 3 shows a computer system 300 with a plurality of computer hardware components configured to carry out steps of a computer implemented method for filtering portions of an image according to various embodiments. The computer system 300 may include a processor 302, a memory 304, and a non-transitory data storage 306. A camera 308 may be provided as part of the computer system 300 (like illustrated in FIG. 3), or may be provided external to the computer system 300.

The processor 302 may carry out instructions provided in the memory 304. The non-transitory data storage 306 may store a computer program, including the instructions that may be transferred to the memory 304 and then executed by the processor 302. The camera 308 may be used for determining the image (for example the image to be filtered).

The processor 302, the memory 304, and the non-transitory data storage 306 may be coupled with each other, e.g. via an electrical connection 310, such as e.g. a cable or a computer bus or via any other suitable electrical connection to exchange electrical signals. The camera 308 may be coupled to the computer system 300, for example via an external interface, or may be provided as parts of the computer system (in other words: internal to the computer system, for example coupled via the electrical connection 310).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the image filtering system 200 and/or for the computer system 300.

What is claimed is:

1. A computer implemented method for filtering portions of an image, the method comprising:
dividing, by computer hardware components, the image into a plurality of segments, each segments comprising a plurality of pixels;
determining, by the computer hardware components and for each of the segments, at least one of an expected value, a standard deviation, and a kurtosis of the plurality of pixels of the respective segment;
clustering, by the computer hardware components, the plurality of segments into a plurality of clusters based on the at least one of the expected value, the standard deviation, and the kurtosis of the plurality of pixels of the respective segment;
determining, by the computer hardware components and for each of the clusters, the respective cluster as belonging to a background based on a size of the respective cluster;
recovering, by the computer hardware components, segments from clusters that belong to the background to be not belonging to the background, wherein recovering the segments from clusters that belong to the background comprises recovering the segments from clusters based on a cluster kurtosis of an expected value for each segment of the respective cluster; and
determining, by the computer hardware components, a filtered image based on the background.

2. The computer implemented method of claim 1,
wherein determining the at least one of an expected value, a standard deviation, and a kurtosis for each of the segments comprises determining based on gray values of pixels for each of the segments the at least one of an expected value, a standard deviation, and a kurtosis.

3. The computer implemented method of claim 1,
wherein recovering the segments from clusters that belong to the background comprises recovering the segments from clusters based on a comparison of the cluster kurtosis of the expected value for each segment of cluster with the kurtosis of the respective segment individually.

4. The computer implemented method of claim 1, further comprising:
providing, by the computer hardware components, an output comprising an indication for each pixel whether the pixel belongs to the background.

5. The computer implemented method of claim 1, further comprising:
providing, by the computer hardware components, an output comprising an indication for each segment whether the segment belongs to the background.

6. The computer implemented method of claim 1, further comprising:
further processing, by the computer hardware components, the image.

7. The computer implemented method of claim 6,
wherein further processing the image comprises at least one of object detection or object classification.

8. The computer implemented method of claim 6, further comprising:
excluding, from further processing, pixels or segments belonging to the background.

9. A computer system comprising computer hardware components configured to filter portions of an image by:
dividing the image into a plurality of segments, each segments comprising a plurality of pixels;
determining, for each of the segments, at least one of an expected value, a standard deviation, and a kurtosis of the plurality of pixels of the respective segment;
clustering the plurality of segments into a plurality of clusters based on the at least one of the expected value, the standard deviation, and the kurtosis of the plurality of pixels of the respective segment;
determining, for each of the clusters, the respective cluster as belonging to a background based on a size of the respective cluster;
recovering segments from clusters that belong to the background to be not belonging to the background, wherein recovering the segments from clusters that belong to the background comprises recovering the segments from clusters based on a cluster kurtosis of an expected value for each segment of the respective cluster; and
determining a filtered image based on the background.

10. The computer system of claim 9, further comprising:
a camera configured to acquire the image.

11. The computer system of claim 9, wherein the computer system is configured for use by a vehicle.

12. The computer system of claim 9, wherein the computer system is configured for use by a vehicle having a camera configured to acquire the image.

13. A non-transitory computer readable medium comprising instructions, that when executed, configure computer hardware components of a computer system to filter portions of an image by:
dividing the image into a plurality of segments, each segments comprising a plurality of pixels;
determining, for each of the segments, at least one of an expected value, a standard deviation, and a kurtosis of the plurality of pixels of the respective segment;
clustering the plurality of segments into a plurality of clusters based on the at least one of the expected value, the standard deviation, and the kurtosis of the plurality of pixels of the respective segment;
determining, for each of the clusters, the respective cluster as belonging to a background based on a size of the respective cluster;
recovering segments from clusters that belong to the background to be not belonging to the background, wherein recovering the segments from clusters that belong to the background comprises recovering the segments from clusters based on a cluster kurtosis of an expected value for each segment of the respective cluster; and
determining a filtered image based on the background.

14. The computer readable medium of claim 13,
wherein the instructions, when executed, further configure the computer hardware components to filter portions of an image by determining the at least one of an expected value, a standard deviation, and a kurtosis for each of the segments comprises determining based on gray values of pixels for each of the segments the at least one of an expected value, a standard deviation, and a kurtosis.

15. The computer readable medium of claim 13,
wherein the instructions, when executed, further configure the computer hardware components to filter portions of an image for a vehicle.

16. The computer readable medium of claim 13,
wherein the instructions, when executed, further configure the computer hardware components to filter portions of an image by providing an output comprising an indication for each pixel whether the pixel belongs to the background.

\* \* \* \* \*